(12) United States Patent
Agar et al.

(10) Patent No.: US 8,963,953 B2
(45) Date of Patent: Feb. 24, 2015

(54) INTERFACE FOR PREVIEWING IMAGE CONTENT

(75) Inventors: John Michael Agar, Kitchener (CA); Antoine Gilles Joseph Boucher, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 133 days.

(21) Appl. No.: 13/348,291

(22) Filed: Jan. 11, 2012

(65) Prior Publication Data

US 2013/0176333 A1 Jul. 11, 2013

(51) Int. Cl.
G09G 5/00 (2006.01)
H04N 1/00 (2006.01)

(52) U.S. Cl.
CPC ....... *H04N 1/00137* (2013.01); *H04N 1/00177* (2013.01)
USPC ............................ 345/629; 345/660; 715/838

(58) Field of Classification Search
None
See application file for complete search history.

(56) References Cited

U.S. PATENT DOCUMENTS

| | | | |
|---|---|---|---|
| 5,760,767 A | 6/1998 | Shore et al. | |
| 2002/0033848 A1* | 3/2002 | Sciammarella et al. | 345/838 |
| 2005/0071781 A1* | 3/2005 | Atkins | 715/838 |
| 2008/0092054 A1* | 4/2008 | Bhumkar et al. | 715/739 |
| 2008/0094420 A1* | 4/2008 | Geigel et al. | 345/660 |
| 2009/0313558 A1* | 12/2009 | Yariv et al. | 715/760 |
| 2010/0153848 A1 | 6/2010 | Saha | |
| 2011/0060994 A1 | 3/2011 | Maxwell et al. | |
| 2011/0061002 A1 | 3/2011 | Bethune et al. | |
| 2011/0264648 A1 | 10/2011 | Gulik et al. | |

FOREIGN PATENT DOCUMENTS

| | | |
|---|---|---|
| EP | 1148412 | 10/2001 |
| EP | 1580996 | 9/2005 |

OTHER PUBLICATIONS

TweetDeck: The Universal Social Networking App, Android. AppStorm, http://android.appstorm.net/reviews/productivity-reviews/tweetdeck-the-universal-social-networking-app, Mar. 15, 2011.
McInnes, Kyle, "BlackBerry 6 Review and Guide: FAQ, Tips and Tricks and Impressions", http://www.blackberrycool.com/2010/08/13/blackberry-6-review-and-guide-faq-tips-and-tricks-and-impressions/, Mar. 23, 2011.

(Continued)

*Primary Examiner* — Tize Ma
*Assistant Examiner* — Yu Chen
(74) *Attorney, Agent, or Firm* — Jon A. Gibbons; Fleit Gibbons Gutman Bongini & Bianco P.L.

(57) ABSTRACT

What is disclosed is a novel method and system to present image content from a variety of informational sources. Presentation from a variety of image sizes and formats, such as standard and panoramic format is possible. The method includes accessing at least two information sources each with separate image content. Next, each of the separate image content is interspersed in an arrangement so that content overlaps in with each other and at least some of the image content is automatically resized to concurrently present image content in a plurality of different image sizes and in a film strip arrangement. The image content is presented from each of the information sources along with the source indicator in a film strip arrangement.

14 Claims, 9 Drawing Sheets

(56) References Cited

OTHER PUBLICATIONS

Cell Phone Comparison: Motorola Droid vs. Motorola Devour, http://www.cell-phone-plans.net/blog/cell-phones/cell-phone-comparison-motorola-droid-vs-motorola-devour/, Mar. 23, 2011.
ReadWriteWeb, "Why No Love for the Universal Inbox?", http://www.readwriteweb.com/archives/why_no_love_for_the_universal_inbox.php, Mar. 23, 2011.
Social Signal, social media that comes alive, http://www.socialsignal.com, Mar. 15, 2011.
Universal Translator email, Chat, Facebook, Twitter, http://www.taranfx.com/voxox-universal-translator, Mar. 15, 2011.
Fuser—Where Inboxes Meet, www.fuser.com/default.aspx, Jan. 11, 2012.
About HTC, www.htc.com/www/about/, Jan. 11, 2012.
"Using Adobe Photoshop Lightroom 3," Jun. 29, 2011, XP55005938, URL:http://help.adobe.com/en_US/Lightroom/3.0/Using/lightroom_3_help.pdf, pp. 43-45; pp. 114-115.
EESR dated Jun. 6, 2012 for European Patent Application No. 12150836.0.
Examiner's Report dated May 16, 2014 for Canadian application No. 2,802,120.

\* cited by examiner

| IDENTIFIER | INFORMATION SOURCE | SOURCE INDICATOR | ... |
|---|---|---|---|
| 100204 | FACEBOOK |  | ... |
| 749721 | PICASSA |  | ... |
| 456781 | TWITTER |  | ... |
| 356127 | LOCAL DRIVE |  | ... |
| ... | ... | ... | |

INTERFACE FOR PREVIEWING IMAGE CONTENT

FIELD OF THE DISCLOSURE

The present disclosure generally relates to presentation of information and more particularly to presenting a collection of multimedia information to a user on an electronic device.

BACKGROUND

Social media is a special type of media for social interaction. The use of web-based and mobile technologies turns social media into a highly accessible and a scalable interactive dialogue. Each information source from social media providers is typically rendered to a viewer in a single separate presentation environment. The presentation environment is typically a web browser, or dedicated application or applet. Many users want to aggregate information from various social media providers into one presentation environment. Tools exist for presenting information from a plurality of social media providers into one interface; however, these interfaces present the various data from the various social media sources in separate windows and separate regions of the same presentation. . Moreover, presenting images from sources with a variety of sizes and formats, such as standard, and panoramic format is difficult.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
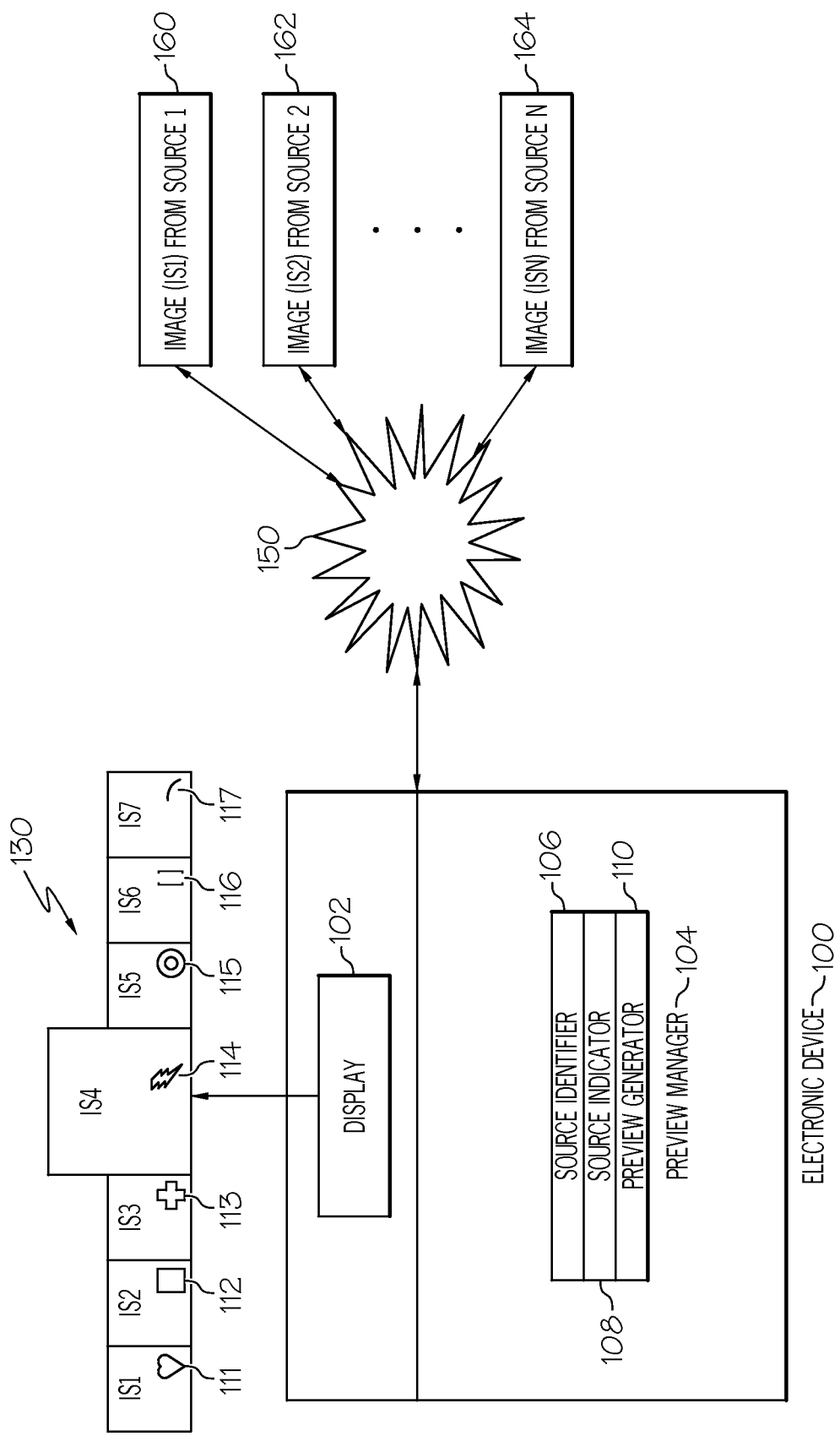
FIG. 1 is a functional diagram illustrating one example of an operating environment for presenting information from a variety of social media providers being integrated into one presentation.

As required, detailed embodiments are disclosed herein. However, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e. open language). The term "coupled" as used herein, is defined as "connected" although not necessarily directly, and not necessarily mechanically.

The term "electronic device" is intended to broadly cover many different types of devices that can wirelessly or through wires receive signals, and in most cases can transmit signals, and may also operate in a wireless or wireless communication system. For example, and not for any limitation, a wireless communication device can include any one or a combination of the following: a computer, a tablet, a laptop, a two-way radio, a cellular telephone, a mobile phone, a smartphone, a wireless messaging device, a set-top box, a media player, a personal digital assistant, and other similar devices.

The term "film strip" is used to refer to two or more images each in an adjacent frame to be presented sequentially typically in a horizontal or vertical orientation. The area or size of each adjacent frame does not need to be uniform and may vary.

The term "image content" refers to an information source with one or more pictures. The information source can be a single still photo, a movie, or combination thereof.

The term "information source" as used herein means multimedia information including any combination of text, graphics, pictures, music, and movies. The information source may include some image content. For example, with music, the metadata, such as cover art, song title, and artist may be provided. The informational feed originates from a variety of sources, including social networking sites, such as, LINKED-IN®, FACEBOOK®, TWITTER®, MYSPACE®, online media sites, such as, PICASSA®, FLICKR®, YOU-TUBE®, and on line storage sites, such as, LIVEDRIVE® and IBACKUP®, and local drives and private local networks. The image content or private information source is typically unique from each site, but in some cases may be shared between sites. For example, a picture on FACEBOOK® media site, may also be on LINKED-IN® media site.

The term "overlay" is used to mean the process of superimposing text or graphic elements on top of an image or other graphic element.

The term "overlap" is used to mean placing one image on top of another image resulting in the top image blocking out portions of the image or images underneath from being viewed.

The term "skyline" refers to a format of a series of images that are not uniform in area and, therefore, resemble a skyline because of the varying heights and widths when the images are presented in a film strip arrangement, a stacked arrangement or overlapping arrangement. The skyline format is especially noticeable when the bottom edges of each of the series of images are aligned along a given horizontal line.

Described below are systems and methods using a presentation manager to present image content from a variety of informational sources. Moreover, the systems and method described below enable the presentation of a variety of image sizes and formats, such as standard and panoramic format.

FIG. 1 is a functional diagram illustrating one example of an operating environment for presenting information from a variety of informational sources to a user of an electronic device 100 with a preview manager 104. The electronic device 100 comprises, among other things, a display 102, the preview manager 104 with a source identifier 106, a source indicator 108, and a preview generator 110. Each of these components is now described.

The source identifier 106, identifies the origin of the multimedia. For example, if the information source is an address, such as a Uniform Resource Locator (URL), the URL is used as an identifier. Likewise, if the source is local computer drive, the computer drive is identified. Each information source that has been indentified is assigned a unique identifier, such as a number to be used in a table as described below. A source indicator 108 associated with the information source may be assigned to each unique identifier. This indicator can be a logo associated with the owner of the URL. The logo can be found using a reverse Domain Name System (DNS) lookup through, for example, whois.net and the trademark database for a country, such as www.uspto.gov in the United States. In another example, the graphic or logo can be determined from the website using HyperText Markup Language (HTML) keyword directive searching e.g., "logo", or through search engines such as GOOGLE®, YAHOO® and BING®. As an illustrative example, if the owner of a website is GOOGLE, the search string "image of google logo" will return an image of the GOOGLE® logo. Or, in another example, if the PICASA web site is being used, the search string "image of Picasa logo" returns a proper logo. Likewise, for local drives of private local area networks, the operating system (OS) "properties of a drive" will return the drive letter and path. A reference to this source indicator 108 is stored in this table for each image source.

The preview generator 110 may access the source indicator 108 associated with the source and further refine it. For example, the preview generator 110 may further adapt the source indicator 108 to, for example, reduce the size, render only an outline of the source indicator 108, increase its transparency when overlaid on an image so the background image is visible, or a combination thereof. These example adaptations are made to minimize the amount of the background image being blocked by the source indicator 108. Other adaptations and combinations of adaptations are also possible.

A set of images 130 in a film strip format on display 102 is shown. Image content denoted "IS1", "IS2", "IS3", "IS4", "IS5", "IS6", "IS7" correspond directly to an image from one of a variety of information sources "IS1" 160, "IS2" 162, and "ISN" 164 being accessed by electronic device 100 though the internet or other global communications network 150. Image content from each image source, such as a social media source, is indicated with a source indicator 111, 112, 113, 114, 115, 116, and 117. The film strip format with source indicator 108 provides a unified interface with all image content from a variety of image sources, displayed to the user. Further, as described below, image content in this film strip format with source indicator 108 is scrollable by the user.

Figure 2:
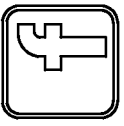
FIG. 2 is a table of various social media providers that are used by the preview manage in FIG. 1.
Figure 2:
Figure 2:
Figure 2:

In one example, the preview manager 104 uses a table 200, as shown in FIG. 2, to manage the association between a unique identifier for a given media source, a source identifier 106 and a source indicator 108. Table 200 includes an identifier column 202 containing the source identifier 106 associated with each information source. This source identifier 106 is unique to each information source, e.g., "IS1" 160, "IS2" 162, and "ISN" 164. Column 204 includes an information source and column 206 includes a source indicator 206 associated with each source identifier 106 of column 202. For example, in row 222 the source is "FACEBOOK®" and the source indicator 108 is a FACEBOOK icon. Next, in row 224 the source is "PICASA®" and the source indicator 108 is a PICASA icon. Next, in row 226 the source is "TWITTER®" and the source indicator 108 is a TWITTER icon. Finally, in row 228, the source is a local drive and the source indicator 108 is a drive icon. These are example information sources only and other information sources for content are possible in other examples.

The source indicator 108 is retrieved by the preview manager 104. The source indicator 108 is associated by the preview manager 104 with the corresponding information source.

Figure 3:
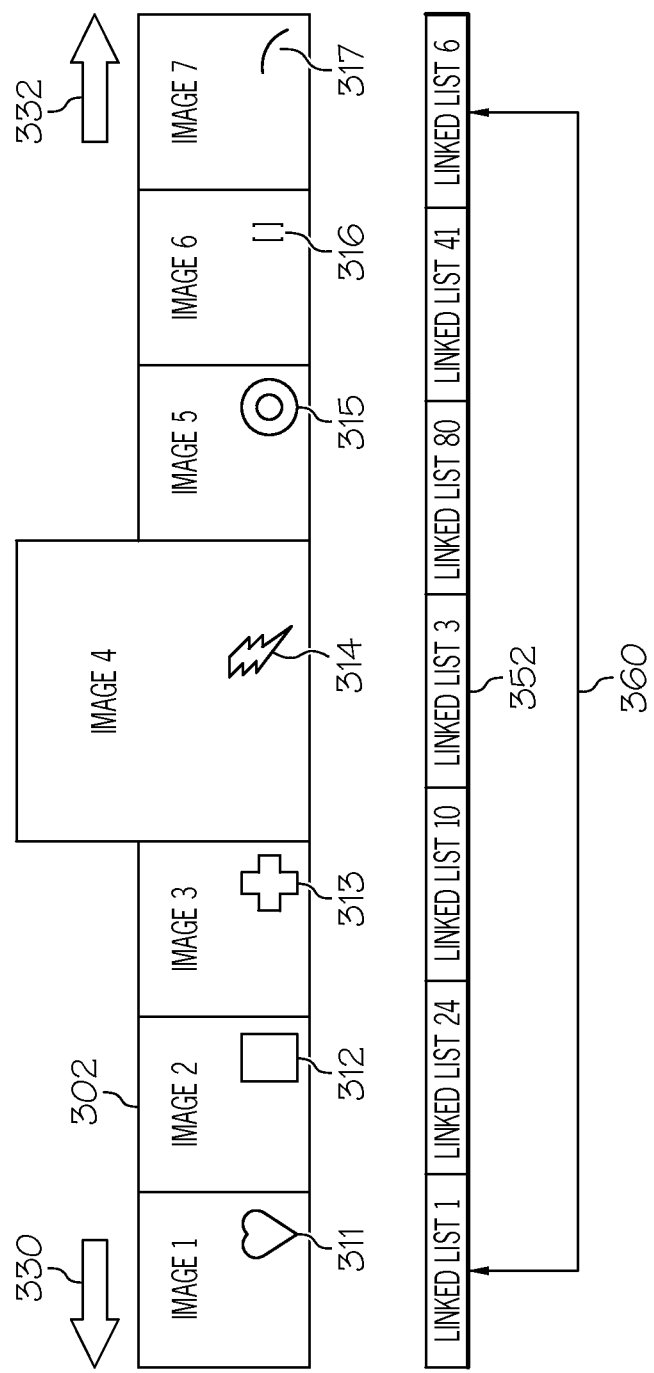
FIG. 3 is a set of images associated with a circular buffer as formed by the preview manager in FIG. 1.

Referring to FIG. 3, shown is a set of images 302 associated with a circular buffer or circular array 352 as formed by the preview manager 104 in FIG. 1. In this example, each of the seven images shown, numbered "IMAGE 1" to "IMAGE 7" has a corresponding entry in the circular array 352. Further, each image "IMAGE 1" to "IMAGE 7" includes at least one source indicator 311, 312, 313, 314, 315, 316, 317 as an overlay on top of the each "IMAGE 1" to "IMAGE 7". The source indicator 311, 312, 313, 314, 315, 316, 317 may be placed in proximity to the image or overlap the image, rather than as an overlay. Typically, the source indicator 311, 312, 313, 314, 315, 316, 317 is designed to maximize the viewing of the underlying image, for example, by being displayed as just an outline of a transparent shape as shown. Although the source indicator 311, 312, 313, 314, 315, 316, 317 is shown in the bottom right for each image in FIG. 3, as will be seen in FIG. 4, the position of this source indicator 311, 312, 313, 314, 315, 316, 317 is variable and is designed to be visible to the user when scrolling through images that may be overlapped. Therefore the position of the source indicator 311, 312, 313, 314, 315, 316, 317 on an image "IMAGE 1" to "IMAGE 7" can change depending on how the image is currently being displayed and what other images are overlapped on top of the image.

In this example, "IMAGE 4" is shown enlarged to denote the current scroll position. As a user scrolls left or right, each image that is the "current" image is automatically enlarged or highlighted. The use of circular buffer 352 allows the images to be continuously scrolled in a first direction 330, e.g., left, or in a second direction 332, e.g., right. The arrow 360 denotes that when a user scrolls through the images using a pointing device or keyboard, the images wrap, rather than stop at the end of the boundary. Stated differently, when the end of the circular buffer 352 is reached, the next entry wraps back to the opposite end, as denoted by arrow 360, to ensure a smooth constant scrolling experience without any boundaries to stop the scrolling. A visual notification, audio notification, or a combination thereof, may be used to inform a user that an entry has wrapped and the content is now repeating.

One type of circular buffer is a linked-list. The principal benefit of a linked list over an array is that the list elements can easily be added or removed without reallocation or reorganization of the entire structure because the data items need not be stored contiguously in memory. Linked lists allow insertion and removal of elements at any point in the list, and can do so with a constant number of operations if the link previous to the link being added or removed is maintained during list traversal.

Figure 4:
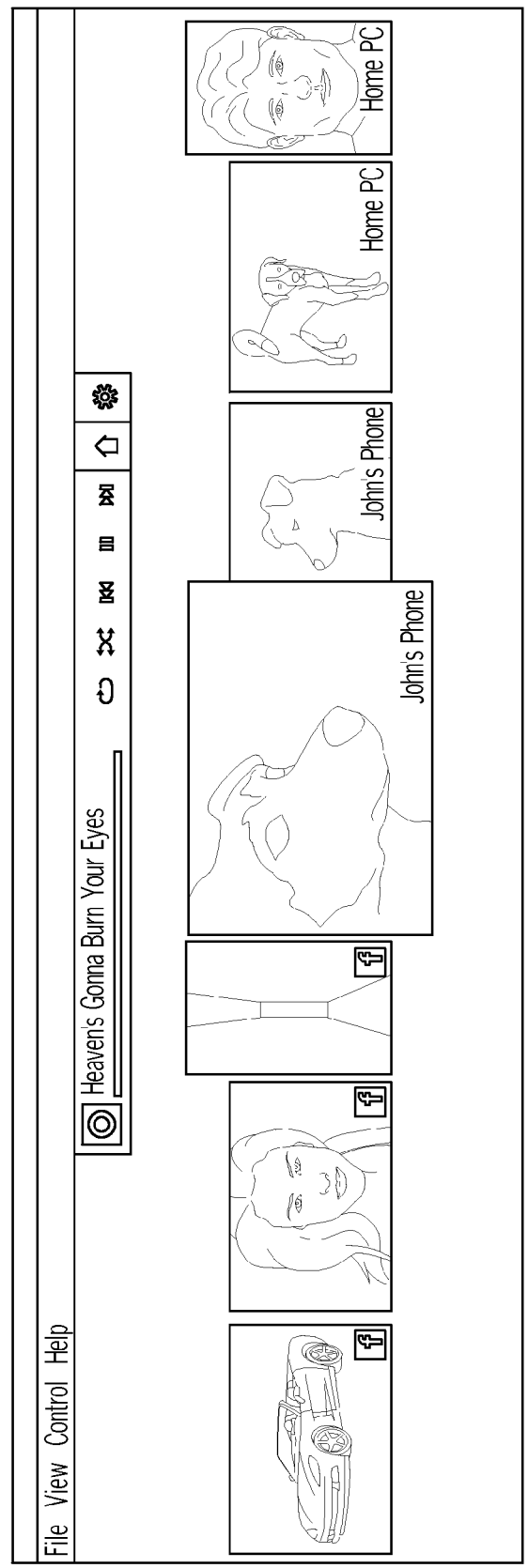
FIG. 4 is an example screen shot of the presentation of image content by the preview manager.

It is important to note that seven images in a horizontal filmstrip format is an example only and other number of images in either a horizontal or vertical filmstrip format are within the true scope and spirit of this example. FIG. 4 is a screen shot of the presentation of image content associated with a circular array 352 by the preview manager 104 of FIG.

1. Source indicators in this screen shot are shown in the bottom-right corner of each image.

Figure 5:
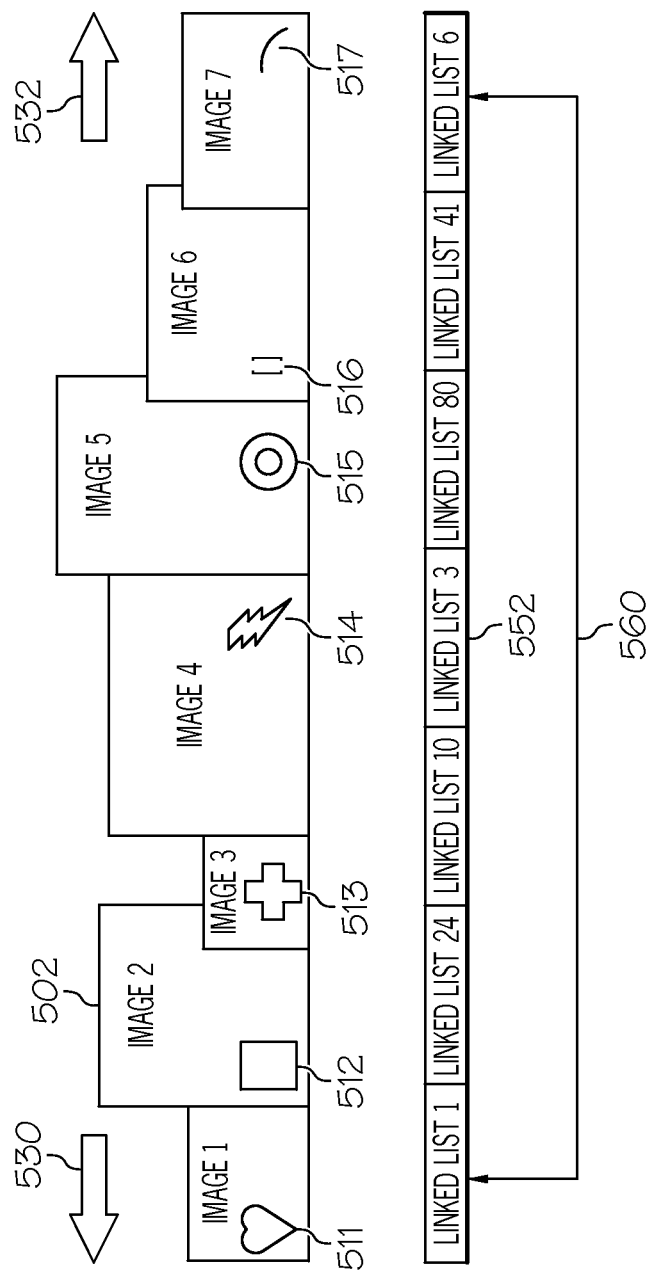
FIG. 5 is a set of images associated in skyline format with a circular buffer as formed by the preview manager in FIG. 1.

Turning now to FIG. 5, shown is a set of images 502 associated in skyline format with a circular buffer 560 as formed by the preview manager 104 in FIG. 1. In this example, each of the seven images shown, numbered "IMAGE 1" to "IMAGE 7" does not have a uniform area. Each image "IMAGE 1" to "IMAGE 7" includes a corresponding entry in a circular buffer or circular array 552. Further, each image includes as least one source indicator 511, 512, 513, 514, 515, 516, 517 as an overlay that is combined on top of the image. The position of the source indicator on an image may change to ensure that it is visible to a user. The source indicator is moved by the preview manage 104 to an area of each image "IMAGE 1" to "IMAGE 7" that is not obscured or covered with another image placed above it. In this example, image subtraction may be used to identify areas not coved by other images. The movement of source indicators to several positions is shown in FIG. 5

Unlike the set of images shown in FIG. 3, each of the set of images 502 in the skyline format has a different area. The calculation of the area for each image is further described below in FIG. 8. Again, the arrow 560 denotes that when a user scrolls through the images in a first direction 530 or a second direction 532 using a pointing device or keyboard, the images wrap, rather than stop at the end of the boundary. Stated differently, when the end of the circular buffer is reached the next entry wraps as denoted by arrow 560 to ensure a smooth constant scrolling experience without any boundaries to stop the scrolling. Also in this skyline view, a visual notification, audio notification, or a combination thereof, may be used to inform a user that an entry has wrapped and the content is now repeating.

Figure 6:
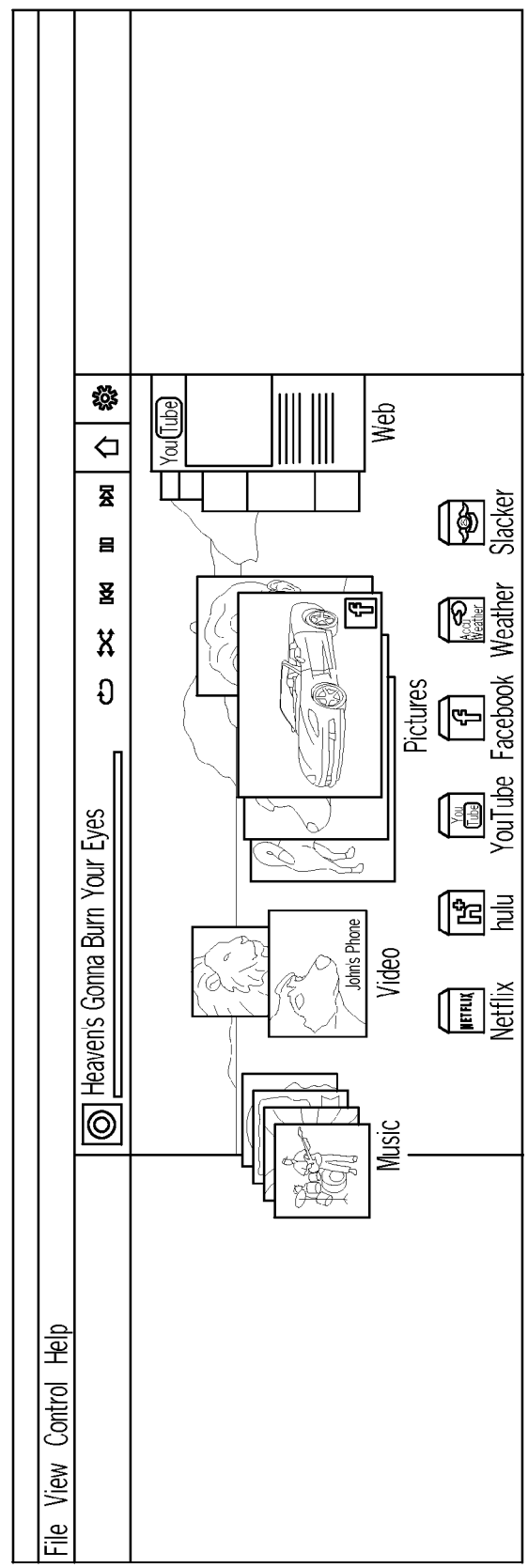
FIG. 6 is an example screen shot of the presentation of image content in a skyline format by the preview manager.

FIG. 6 is a screen shot of the presentation of image content in a skyline format of groupings of images. The process for implementing the skyline format is described below in FIGS. 7-8. Notice each image in the group of images forming the skyline view has a different area. Also, each group of images is associated with a circular array 352 by the preview manager 104 of FIG. 1. This association of each group of images (VIDEO, PICTURES, WEB) with its own circular array 352 allows a user to "flip through" each grouping in a circular manner individually. This makes previewing content from various sources simple.

Figure 7:
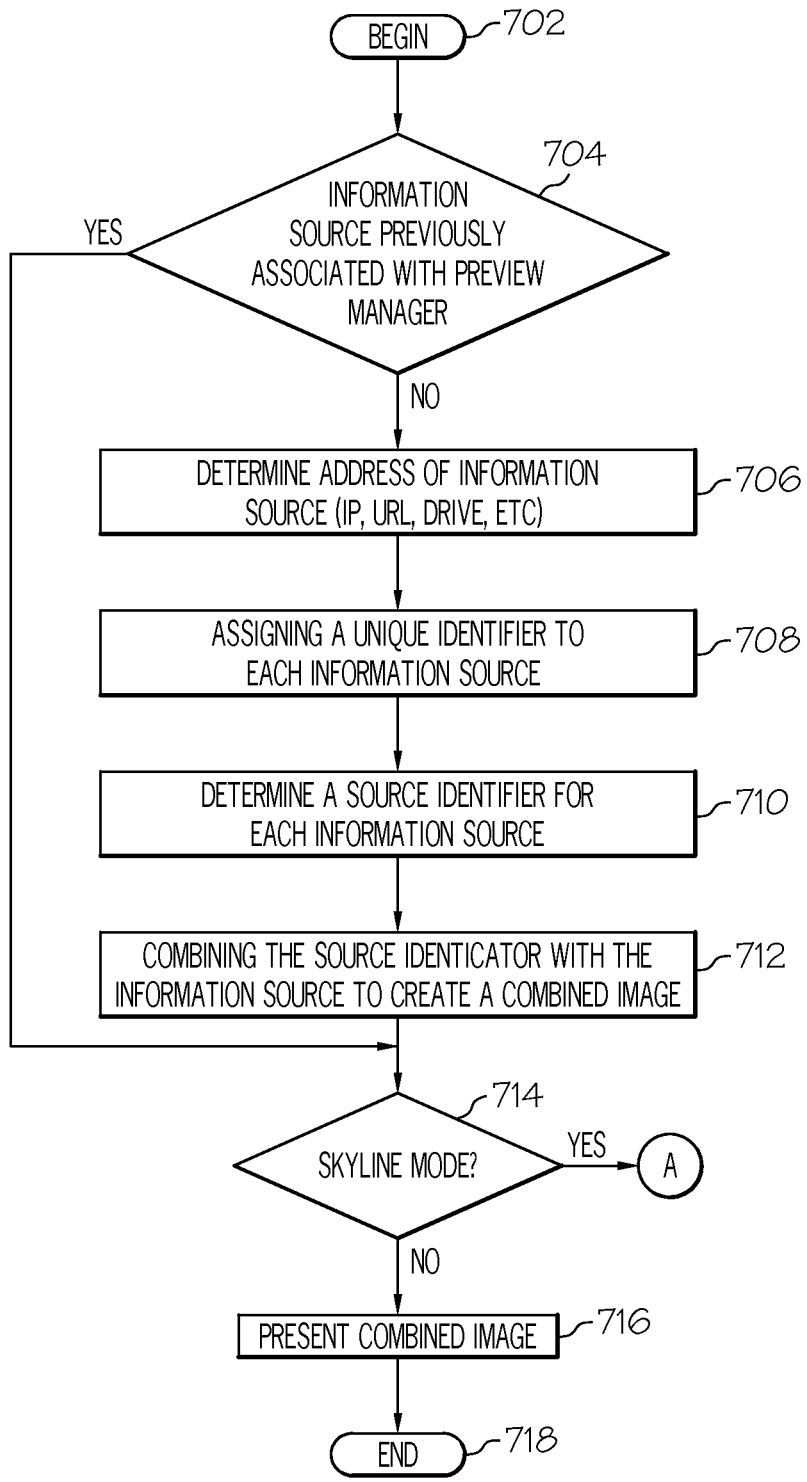
FIG. 7 is a high level flow of the preview manager using the table of FIG. 2.
Figure 8:
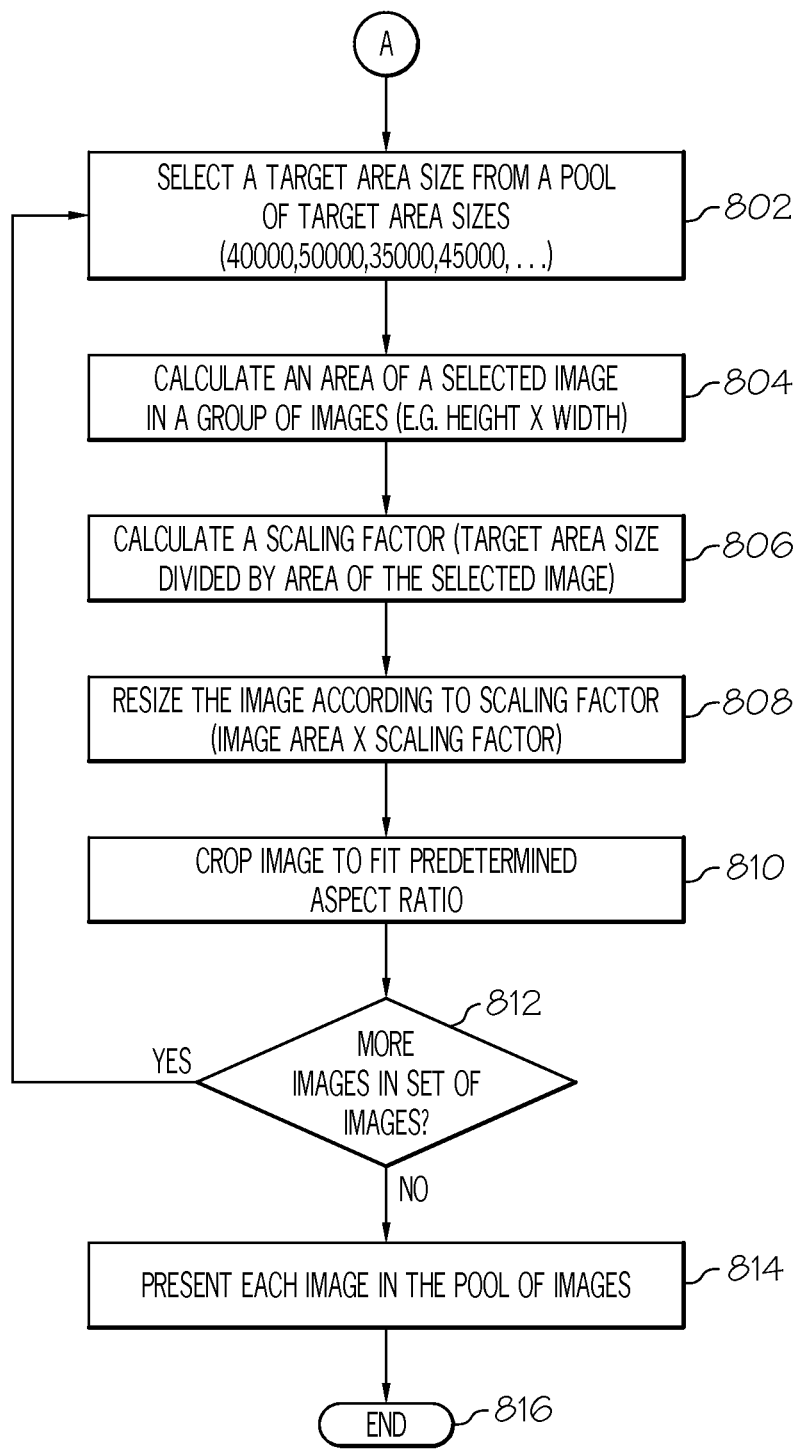
FIG. 8 is a high level flow of the preview manager adjusting the size and orientation of the content from each social media provider.

Referring now to FIGS. 7-8, the flowcharts and block diagrams in the figures illustrate the architecture, functionality, and operation of possible implementations of systems, methods, and computer program products according to various examples discussed. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 7 is a high level flow of the preview manager 104 using the table 200 of FIG. 2. The process begins in step 702 and immediately proceeds to step 704 in which a test is made to determine if a current information source is previously associated with the preview manager. If the information source was previously associated, the process flows to step 714 as shown and further described below. In the case where the information source was not previously associated, the address of the information source is determined in step 706. The address is an internet protocol (IP) address, uniform resource locator (URL), drive address, media access control (MAC) address or other unique identifier on a wired or wireless network. A unique identifier is assigned to each information source in step 708. The information source can be a public, a private, or a personal information source. A public information source is generally accessible to anyone, such as a photo sharing site. In contrast, a private information source access control is used to control access, such as a social media site. Typical access control is a userid and password or other forms of authentication. A personal information source is typically a local drive, personal network resource, or drive not shared with any third party. Next, in step 710, a source indicator for each information source is determined. As described above, this source indicator can be a logo or icon to represent the source of the information. In step 714, a test is made whether the skyline mode is enabled. In the case that the skyline mode is not enabled, the process flows to step 716 to render the combined image with the source indicator and ends in step 718. FIGS. 3 and 4 illustrate an example of the combined image. Otherwise, in step 714, in the case that the skyline mode is enabled, the process flows to FIG. 8.

FIG. 8 is a high level flow of the preview manager adjusting the size and orientation of the content from each social media provider to create a skyline view. The flow continues from node A of FIG. 7 to step 802, in which a target area size for an image is selected, typically randomly, from a pool of target area sizes (e.g., 4000, 5000, 35000, 45000, . . . ). The target area size may be measure in pixels or other units. Once a target area size is selected, the area size of the image from the information source is calculated. In the case when the image is rectangular, the area is given by: Area =Height multiplied by Width. Next, in step 806, a scaling factor is calculated by dividing the target area size selected in step 802 by the area of the image in step 804. The image is resized according to the calculated scaling factor by taking the image area calculated in step 804 multiplied by the scaling factor calculated in step 806. Optionally, in step 810, the image is cropped to fit a predetermined aspect ratio (e.g., 1 to 1, 4 to 3, 3 to 2, 5 to 4, 6 to 7, 16 to 9, etc.). A test is made in step 812 to determine if more images in the set of images are present. In case more images are present, the process loops back to step 802. Otherwise, the process renders each image in the pool of images as a resized image in step 814 and the process ends in step 816. FIGS. 5 and 6 illustrate an example of the combined image using skyline mode.

The above process provides a varying skyline format. The varying comes from the randomness of selecting the total area size for the next image and scale the image to match the target area. If the next picture is the same dimensions (likely the case for most cameras) then the random selection form the pool of target areas will ensure that the varying areas result in varying heights.

Additional randomness comes from the fact that the pictures themselves will have varying aspect ratios: Some will be portrait, some landscape, 4 to 3, 16 to 9, etc. With a base randomness generated by the pool, and addition randomness from the images being transformed, it is unlikely that the user will be able to detect a repeating pattern in the skyline.

The clamping of the aspect ratio to a predefined maximum between height and width may be done by cropping the image to fit this ratio. This predefined maximum is changeable by the user. This optional cropping is especially important with panoramic images.

Figure 9:
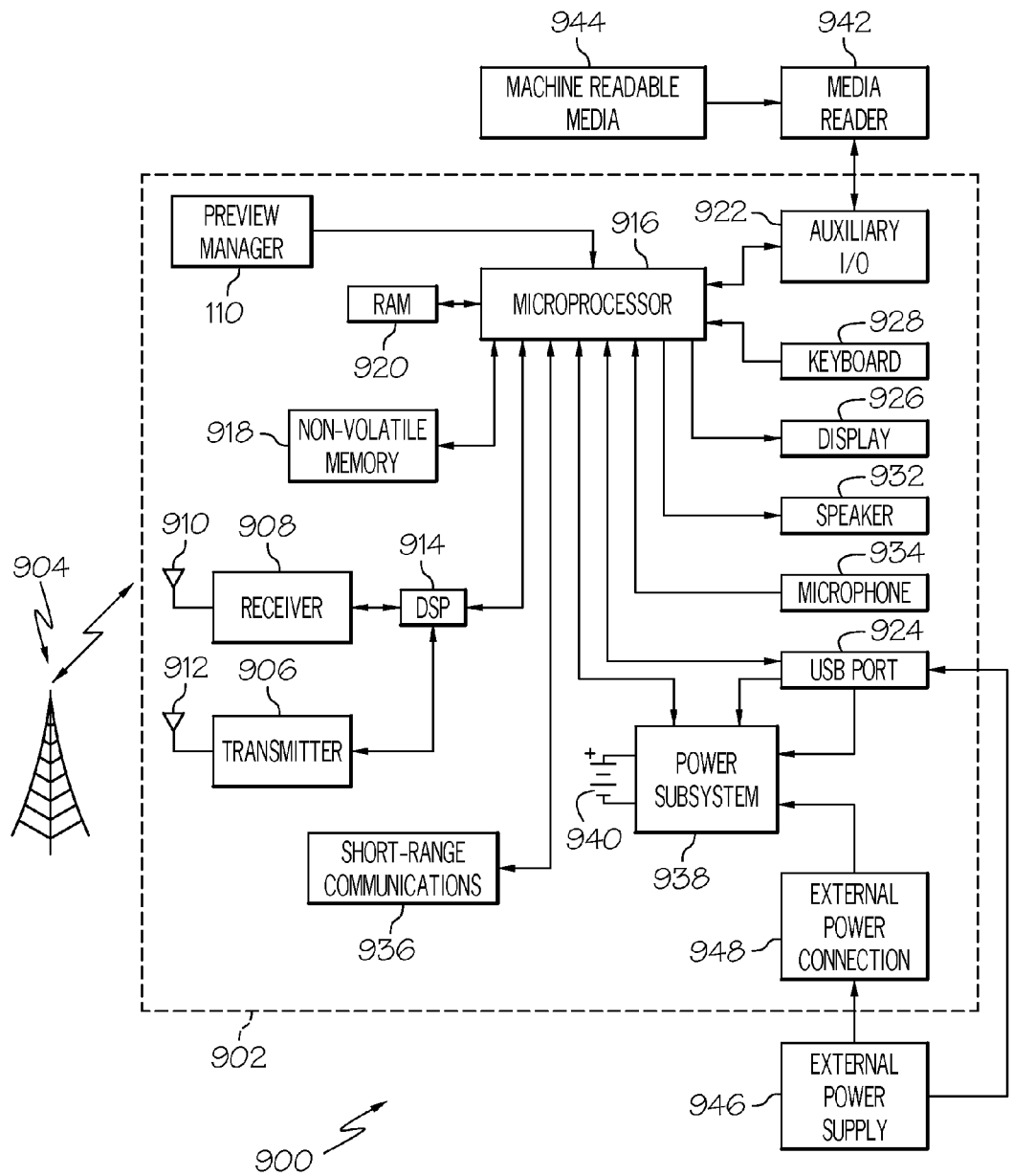
FIG. 9 is a block diagram of an electronic device and associated components in which the systems and methods disclosed herein may be implemented.

FIG. 9 is a block diagram of an electronic device and associated components 900 in which the systems and methods disclosed herein may be implemented. The electronic device, can be any electronic device, such as a set-top box, computer, and tablet computer, capable of displaying image content being accessed over a network. Moreover, some of the components described below such as batteries may not be included in set-top box. In this example, an electronic device 902 is a wireless two-way communication device with voice and data communication capabilities. Such electronic devices communicate with a wireless voice or data network 904 using a suitable wireless communications protocol. Wireless voice communications are performed using either an analog or digital wireless communication channel. Data communications allow the electronic device 902 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 902 is an example electronic device that includes two-way wireless communications functions. Such electronic devices incorporate communication subsystem elements such as a wireless transmitter 906, a wireless receiver 908, and associated components such as one or more antenna elements 910 and 912. A digital signal processor (DSP) 914 performs processing to extract data from received wireless signals and to generate signals to be transmitted. The particular design of the communication subsystem is dependent upon the communication network and associated wireless communications protocols with which the device is intended to operate.

The electronic device 902 includes a microprocessor 916 (that controls the overall operation of the electronic device 902). The microprocessor 916 interacts with the above described communications subsystem elements and also interacts with other device subsystems such as non-volatile memory 918 and random access memory (RAM) 920. The non-volatile memory 918 and RAM 920 in one example contain program memory and data memory, respectively. The microprocessor 916 also interacts with the preview manager 104 and its components, an auxiliary input/output (I/O) device 922, a USB Port 924, a display 926, a keyboard 928, a speaker 932, a microphone 934, a short-range communications subsystem 936, a power subsystem 938, and any other device subsystems.

Although in this description, the electronic device is a two-way wireless communications device, in other examples, such as a set-top box, other I/O connectors are included as part of the auxiliary I/O 922. These other I/O connectors, not shown, include one or more coaxial television cable interfaces, high-definition multimedia interface (HDMI), and optical audio connectors.

A battery 940 is connected to a power subsystem 938 to provide power to the circuits of the electronic device 902. The power subsystem 938 includes power distribution circuitry for providing power to the electronic device 902 and also contains battery charging circuitry to manage recharging the battery 940. The power subsystem 938 includes a battery monitoring circuit that is operable to provide a status of one or more battery status indicators, such as remaining capacity, temperature, voltage, electrical current consumption, and the like, to various components of the electronic device 902. An external power supply 946 is able to be connected to an external power connection 948.

The USB port 924 further provides data communication between the electronic device 902 and one or more external devices. Data communication through USB port 924 enables a user to set preferences through the external device or through a software application and extends the capabilities of the device by enabling information or software exchange through direct connections between the electronic device 902 and external data sources rather than via a wireless data communication network.

Operating system software used by the microprocessor 916 is stored in non-volatile memory 918. Further examples are able to use a battery backed-up RAM or other non-volatile storage data elements to store operating systems, other executable programs, or both. The operating system software, device application software, or parts thereof, are able to be temporarily loaded into volatile data storage such as RAM 920. Data received via wireless communication signals or through wired communications are also able to be stored to RAM 920. As an example, a computer executable program configured to perform the preview manager 104, described above, is included in a software module stored in non-volatile memory 918.

The microprocessor 916, in addition to its operating system functions, is able to execute software applications on the electronic device 902. A predetermined set of applications that control basic device operations, including at least data and voice communication applications, is able to be installed on the electronic device 902 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. Further applications include applications that have input cells that receive data from a user.

Further applications may also be loaded onto the electronic device 902 through, for example, the wireless network 904, an auxiliary I/O device 922, USB port 924, short-range communications subsystem 936, or any combination of these interfaces. Such applications are then able to be installed by a user in the RAM 920 or a non-volatile store for execution by the microprocessor 916.

In a data communication mode, a received signal such as a text message or web page download is processed by the communication subsystem, including wireless receiver 908 and wireless transmitter 906, and communicated data is provided the microprocessor 916, which is able to further process the received data for output to the display 926, or alternatively, to an auxiliary I/O device 922 or the USB port 924. A user of the electronic device 902 may also compose data items, such as e-mail messages, using the keyboard 928, which is able to include a complete alphanumeric keyboard or a telephone-type keypad, in conjunction with the display 926 and possibly an auxiliary I/O device 922. Such composed items are then able to be transmitted over a communication network through the communication subsystem.

For voice communications, overall operation of the electronic device 902 is substantially similar, except that received signals are generally provided to a speaker 932 and signals for transmission are generally produced by a microphone 934. Alternative voice or audio I/O subsystems, such as a voice message recording subsystem, may also be implemented on the electronic device 902. Although voice or audio signal output is generally accomplished primarily through the speaker 932, the display 926 may also be used to provide an indication of the identity of a calling party, the duration of a voice call, or other voice call related information, for example.

Depending on conditions or statuses of the electronic device 902, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 936 is a further optional component which may provide for communication between the electronic device 902 and different systems or devices, which need not necessarily be similar devices. For example, the short-range communications subsystem 936 may include an infrared device and associated circuits and components or a Radio Frequency based communication module such as one supporting Bluetooth® communications, to provide for communication with similarly-enabled systems and devices.

A media reader 942 is able to be connected to an auxiliary I/O device 922 to allow, for example, loading computer readable program code of a computer program product into the electronic device 902 for storage into non-volatile memory 918. In one example, computer readable program code includes instructions for performing the pressure detecting user input device operating process 900, described above. One example of a media reader 942 is an optical drive such as a CD/DVD drive, which may be used to store data to and read data from a computer readable medium or storage product such as computer readable storage media 944. Examples of suitable computer readable storage media include optical storage media such as a CD or DVD, magnetic media, or any other suitable data storage device. Media reader 942 is alternatively able to be connected to the electronic device 902 through the USB port 924 or computer readable program code is alternatively able to be provided to the electronic device 902 through the wireless network 904.

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method on an electronic device comprising:
assigning, by an preview manager, a distinct network address for each of a plurality of information sources with separate image content, by
   a) determining if a distinct network address is previously associated with one information source out of the plurality of information sources;
   b) in response to a distinct network address not previously associated with the one of the information source out of the plurality of information sources, assigning a distinct network address to the one of the information source, repeating step a and step b until a distinct network address is assigned to each of the plurality of information sources;
accessing each of the information sources each with separate image content with each distinct network address that has been previously associated therewith;
resizing each of the separate image content automatically to present image content in both a landscape and a portrait overlapping arrangement by
   randomly selecting a target area size from a collection of various target area sizes which is independent of a size of the separate image content,
   calculating an area of the separate image content,
   calculating a scaling factor for the separate image content by dividing the target area by the area of the separate image content, and
resizing the separate image content based on the scaling factor to produce a collection of separate image content each with a different area size;
superimposing a source indicator, related to the distinct network address associated therewith, on top of each of the separate image content to indicate an information source of an associated information feed; and
presenting on a display, each of the separate image content from each of the information sources along with the source indicator in an interspersed arrangement so that each of the separate image content overlaps with at least one adjacent separate image content, and the separate image content are presented in a plurality of different image sizes and a bottom edge of each separate image content is aligned along horizontal line in a film strip arrangement.

2. The method of claim 1, wherein the film strip arrangement is one of a horizontal film strip arrangement and a vertical film strip arrangement.

3. The method of claim 1, wherein one of the information sources is from a first social media source and a second of the information sources is provided by a second social media source.

4. The method of claim 1, wherein a first of the information sources is from a private pictorial information source with access controlled by a user and a second of the information sources is provided by a third party social media site with access by the user and at least one additional user permitted access to the third party social media site.

5. The method of claim 1, further comprising:
in response to receiving a user input, scrolling through the image content in each frame of the film strip in a first direction.

6. The method of claim 5, wherein the separate image content in the film strip arrangement is stored as a circular buffer in order to provide continuous scrolling through each frame of the film strip arrangement by logically returning to a first frame of the film strip arrangement after presenting a last frame of the film strip.

7. The method of claim 1, wherein the resizing each of the separate image content automatically includes cropping the each of the separate image content that has been resized to fit a predetermined aspect ratio.

8. A method to provide a graphical interface comprising:
assigning, by an preview manager, a distinct network address for each of a plurality of information sources with separate image content, by
a) determining if a distinct network address is previously associated with one information source out of the plurality of information sources;
b) in response to a distinct network address not previously associated with the one of the information source out of the plurality of information sources, assigning a distinct network address to the one of the information source, repeating step a and step b until a distinct network address is assigned to each of the plurality of information sources;
accessing each of the information sources each with separate image content with each distinct network address that has been previously associated therewith;
resizing each of the separate image content automatically to present image content in both a landscape and a portrait overlapping arrangement by
randomly selecting a target area size from a collection of various target area sizes which is independent of a size of the
separate image content, calculating an area of the separate image content,
calculating a scaling factor for the separate image content by dividing the target area by the area of the separate image content,
resizing the separate image content based on the scaling factor to produce a collection of separate image content each with a different area size, and
cropping each of the separate image content to a predetermined aspect ratio;
superimposing a source indicator, related to the distinct network address associated therewith, on top of each of the separate image content to indicate an information source of an associated information feed; and
presenting on a display, each of the separate image content from each of the information sources along with the source indicator in an interspersed arrangement so that each of the separate image content overlaps with at least one adjacent separate image content, and the separate image content are presented in a plurality of different image sizes and a bottom edge of each separate image content is aligned along horizontal line in a film strip arrangement.

9. The method of claim 8, wherein one of the information sources is from a first social media source and a second of the information sources is provided by a second social media source.

10. The method of claim 9, wherein one of the information sources is from a private pictorial information source with access controlled by a user and a second of the information sources is provided by a third party social media site with the access by the user and at least one additional user to access the third party social media site.

11. The method of claim 10, further comprising:
in response to receiving a user's command, scrolling through each of the image content in a first direction.

12. The method of claim 11, wherein the separate image content in the film strip arrangement is stored as a circular buffer in order to provide continuous scrolling through each frame of the film strip arrangement by logically returning to a first frame of the film strip arrangement after presenting a last frame of the film strip.

13. An electronic device, the electronic device comprising:
a memory;
a processor communicatively coupled to the memory; and
a preview manager communicatively coupled to the memory and the processor, the preview manager configured to perform:
assigning a distinct network address for each of a plurality of information sources with separate image content, by
a) determining if a distinct network address is previously associated with one information source out of the plurality of information sources;
b) in response to a distinct network address not previously associated with the one of the information source out of the plurality of information sources, assigning a distinct network address to the one of the information source,
repeating step a and step b until a distinct network address is assigned to each of the plurality of information sources;
accessing each of the information sources each with separate image content with each distinct network address that has been previously associated therewith;
resizing each of the separate image content automatically to present image content in both a landscape and a portrait overlapping arrangement by
randomly selecting a target area size from a collection of various target area sizes which is independent of a size of the separate image content,
calculating an area of the separate image content,
calculating a scaling factor for the separate image content by dividing the target area by the area of the separate image content, and
resizing the separate image content based on the scaling factor to produce a collection of separate image content each with a different area size;
superimposing a source indicator, related to the distinct network address associated therewith, on top of each of the separate image content to indicate an information source of an associated information feed; and
presenting on a display, each of the separate image content from each of the information sources along with the source indicator in an interspersed arrangement so that each of the separate image content overlaps with at least one adjacent separate image content, and the separate image content are presented in a plurality of different image sizes and in a film strip arrangement.

14. The electronic device of claim 13, wherein the resizing each of the separate image content automatically includes cropping each of the separate image content to a predetermined aspect ratio.

* * * * *